Patented Feb. 26, 1952

2,586,995

UNITED STATES PATENT OFFICE 2,586,995

POLYFURCATE AZONITRILES

James A. Robertson, Wilmington, Del., assignor to E. I. du Pont de Nemours & Company, Wilmington, Del., a corporation of Delaware No Drawing. Application January 15, 1948, Serial No. 2,552

5 Claims. (Cl. 260—192)

This invention relates to new azo compounds of particular utility in addition polymerization.

The polymerization of polymerizable compounds containing an ethylenic double bond has been initiated by a wide variety of compounds. Peroxides have been widely used for this purpose. Certain azo compounds have been found useful for this purpose. Others have been found to be without initiatory activity.

This invention has as an object the preparation of new azo compounds. A further object is the provision of new catalysts or initiators for the addition polymerization of polymerizable compounds containing an ethylenic double bond. Other objects will appear hereinafter.

These objects are accomplished by the invention of acyclic azo compounds in which the acyclic azo, —N=N—, group is bonded to different, i. e., distinct, i. e., discrete, tertiary carbons whose three remaining valences are satisfied by (1) a nitrile group, (2) a methyl group and (3) a methylene group further bonded to a hydrogen free carbon. The preferred azo compounds are represented by the general formula

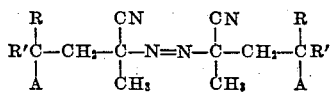

where R and R' are lower alkyl radicals (1–4 carbon alkyls) and A is a radical attached to the gamma carbon by a non-metallic element of atomic number of at least 6, e. g., oxygen, carbon, and preferably from 6 to 8.

The following examples in which parts are by weight are illustrative of the invention.

EXAMPLE I

*Preparation of alpha, alpha' - azobis(alpha, gamma-dimethyl-gamma-ethoxyvaleronitrile*

In a container fitted with a reflux condenser and stirrer were placed 20 parts of methyl beta-ethoxyisobutyl ketone (obtained according to the method of Hoffman, J. Am. Chem. Soc. 49, 432 (1927)) and 3.5 parts of hydrazine hydrate. The mole ratio of hydrazine to ketone was one to two. After refluxing for six hours, the organic product was extracted with ether and the extract dried over anhydrous magnesium sulfate and distilled.

The azine boiling at 95–105° C. at 8 mm. pressure was obtained. The azine has the formula

[(CH₃)₂C(OC₂H₅)CH₂—C(CH₃)=N—]₂

The azine was mixed with about 40 parts of liquid hydrogen cyanide containing less than 5% water and allowed to stand 48 hours at about room temperature. Excess hydrogen cyanide was evaporated under reduced pressure and the residual hydrazonitrile was stirred with about 25 parts of ethanol, 75 parts water and 25 parts concentrated hydrochloric acid, cooled to 0–10° C. and chlorine gas introduced into the mixture until an excess was present. The azonitrile was collected on a filter and dissolved in ether. The ether solution was dried over anhydrous magnesium sulfate and the azonitrile precipitated by cooling the ether solution with solid carbon dioxide. The solid isomer of the azonitrile was obtained by filtration while the liquid isomer remained in solution. The solid isomer melted at 85–87° C. The total yield of azonitrile was 64% based on the ketone. The analysis of the azonitrile was: Calculated for

[(CH₃)₂—C(OC₂H₅)CH₂—C(CH₃)(CN)—N=]₂

C, 64.3; H, 10.1; N, 16.7. Found: C, 64.2; H, 9.7; N, 17.3.

EXAMPLE II

*Preparation of alpha,alpha'-azobis(alpha,gamma-dimethyl-gamma-methoxyvaleronitrile)*

The general procedure of Example I was repeated with methyl beta-methoxyisobutyl ketone (obtained by the process of U. S. Patent 1,823,704) as the ketone. There was obtained a 48% yield of alpha,alpha'-azobis(alpha,gamma-dimethyl-gamma-methoxyvaleronitrile) as two isomers which after separation melted at 58° and 107° C. The analysis was: Calculated for

C₁₆H₂₈N₂O₄

C, 62.3; H, 9.1; N, 18.2. Found: C, 62.3; H, 9.2; H, 18.5.

EXAMPLE III

*Preparation of alpha,alpha'-azobis(alpha,gamma-dimethyl-gamma-n-butoxyvaleronitrile)*

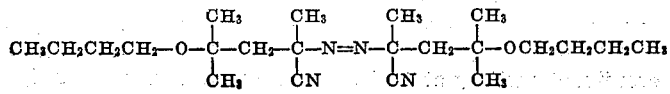

The general procedure of Example I was repeated with methyl beta-n-butoxyisobutyl ketone (obtained by the Hoffman procedure) as the ketone. There was obtained an 11% yield of alpha,alpha' - azobis(alpha,gamma - dimethyl-gamma-n-butoxyvaleronitrile) melting at 69–71° C. The analysis was: Calculated for $C_{27}H_{40}N_4O_2$: C, 67.3; H,10.2; N, 14.3. Found: C, 66.4; H, 10.3; N, 13.9.

EXAMPLE IV

*Preparation of alpha,alpha'-azobis(alpha,gamma,gamma-trimethylvaleronitrile)*

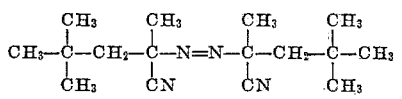

The general procedure of Example I was repeated with methyl neopentyl ketone (obtained by the process of McCubben and Adkins, J. Am. Chem. Soc. 52, 2547 (1930)) as the ketone. There was obtained a 29% yield of alpha,alpha'-azobis-(alpha,gamma,gamma-trimethylvaleronitrile) as two isomers which after separation melted at 65° and 102–103° C. The analysis was: Calculated for $C_{16}H_{28}N_4$: C, 69.6; H, 10.1; N, 20.3. Found: C, 69.7; H. 10.3; N, 20.5.

EXAMPLE V

*Preparation of alpha,alpha'-azobis(alpha,gamma-dimethyl-gamma-phenylvaleronitrile)*

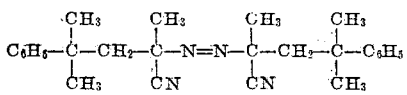

The general procedure of Example I was repeated with methyl beta-phenylisobutylketone (obtained by the process of Hoffman, J. Am. Chem. Soc. 51, 2543 (1929)) as the ketone. There was obtained a 26% yield of alpha,alpha'-azobis(alpha-gamma-dimethyl-gamma - phenylvaleronitrile) melting at 75–76° C. The analysis was: Calculated for $C_{26}H_{32}N_4$: C, 78.0; H, 8.0; N, 14.0. Found: C, 77.5; H, 8.1; N, 14.0.

EXAMPLE VI

*Preparation of alpha,alpha'-azobis(alpha,gamma-dimethyl-gamma-carboxyvaleronitrile)*

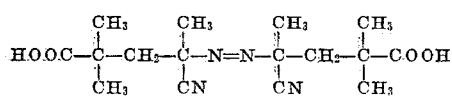

To a solution of 24 parts of methyl beta-carboxyisobutyl ketone (prepared by the process of Lapworth, J. Am. Chem. Soc. 85, 1218 (1904)) in 100 parts of water containing 6.9 parts of sodium hydroxide was added 4 parts of hydrazine hydrate. After standing 20 hours at room temperature, 31 parts of hydrogen cyanide was added. This mixture was maintained at 25° C. for 16 hours and poured into dilute hydrochloric acid after removal of excess hydrogen cyanide and hydrochloric acid, the solid product was filtered and crystallized from aqueous ethanol. The acid hydrazonitrile thus obtained melted at 175° C. A total of 4 parts of the hydrazonitrile was slurried in a solution of 50 parts of water and 15 parts concentrated hydrochloric acid. Chlorine was passed in until an excess was present. The solid product obtained was filtered and crystallized from ethanol. There was obtained a 25% yield based on the ketone of alpha,alpha'-azobis(alpha,gamma - dimethyl-gamma-carboxyvaleronitrile) melting at 140° C. The analysis was:

Calculated for $C_{16}H_{24}N_4O_4$: C, 57.1; H, 7.1. Found: C, 57.3; H, 7.3.

EXAMPLE VII

*Polymerization of acrylonitrile*

Each of a series of pressure bottles was charged with 21.2 parts acrylonitrile, 80 parts cyclohexane and 0.1 mole per cent of azo catalyst. The air was flushed out of the bottles with nitrogen and the bottles and contents heated at 40° C. for two hours. The amount of polymerization was determined by isolating and weighing the polymer. The following table shows the amount of polymerization (conversion of monomer to polymer) for different catalysts of the formula

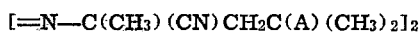

[=N—C(CH₃)(CN)CH₂C(A)(CH₃)₂]₂

These catalysts are present in substantially equimolar amounts.

TABLE I

| Catalyst A= | Catalyst (parts by weight) | Conversion Per cent |
|---|---|---|
| —OCH₃ | 0.12 | 77 |
| —OC₂H₅ | .135 | 79 |
| —OC₄H₉(n) | .155 | 80 |
| —CH₃ | .11 | 72 |
| —H | .10 | 7 |

When the above procedure was repeated except that the polymerization time was increased to 5½ hours and the catalyst was that of Example V (i. e., A in the above formula was —C₆H₅), the per cent of conversion of the monomor to polymer was 85. The per cent conversion of the control (A in the above formula was —H) at 5½ hours was 57%. In a similar manner, the catalyst of Example VI (i. e., A=COOH), was effective as a polymerization catalyst at 60° C.

The activity of the azo catalysts of the above general formula which have no hydrogen on the gamma carbon is shown by reference to the low conversion effected by the last compound in Table I (A=H, i. e., alpha,alpha'-azobis(alpha,gamma-dimethylvaleronitrile)), which has hydrogen on the gamma carbons. Example VIII further compares the activity of the latter compound with a compound coming under the scope of this invention.

EXAMPLE VIII

*Polymerization of methyl methacrylate*

Under the same conditions of temperature (38.9° C.), and catalyst concentration in the bulk polymerization of methyl methacrylate monomer containing 3% methyl methacrylate polymer and 0.007% methacrylic acid (using about 0.005% of catalyst), the polymerization time to obtain a completely polymerized sheet with alpha,alpha'-azobis(alpha,gamma - dimethyl - gamma - methoxyvaleronitrile) was one-half that required for alpha,alpha' - azobis(alpha,gamma - dimethyl-valeronitrile) and one-fourth that required when benzoyl peroxide was employed (30 hours).

EXAMPLE IX

*Polymerization of vinyl chloride*

A series of pressure bottles were each charged with 40 parts vinyl chloride, 47 parts cyclohexane and 0.5 mole per cent of azo catalyst. The bottles and contents were heated at 28° C. for 16 hours. The following table shows the amount of polymerization for different catalysts of the formula

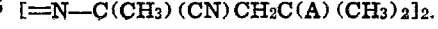

[=N—C(CH₃)(CN)CH₂C(A)(CH₃)₂]₂.

TABLE II

| Catalyst A= | Catalyst (parts by weight) | Conversion Per cent |
|---|---|---|
| —CH₃ | 0.9 | 33 |
| —OCH₃ | 1.0 | 57 |
| —OC₂H₅ | 1.1 | 55 |
| —OC₄H₉ | 1.25 | 60 |
| —H | 0.8 | 39 |

EXAMPLE X

*Polymerization of ethylene*

A pressure reactor was charged with 80 parts of benzene and 0.1 part alpha,alpha′ - azobis- (alpha,gamma - dimethyl - gamma - methoxyvaleronitrile). After removal of oxygen, the reactor was charged with ethylene and heated to 50° C. During the reaction period (8 hours), the ethylene pressure was maintained at 800–900 atmospheres. After cooling and removal of excess ethylene, there was obtained 4 parts of polyethylene which had a tensile strength of 2930 p. s. i. at an elongation of 19%.

EXAMPLE XI

*Copolymerization of dichlorodifluoroethylenes with vinyl chloride*

Two silver-lined pressure reactors of capacity of 400 parts of water were each charged with 225 parts of water, 1 part $Na_4P_2O_7$, 0.15 part alpha,-alpha′ - azobis(alpha,gamma - dimethyl-gamma-methoxyvaleronitrile), 50 parts vinyl chloride and 10 parts dichlorodifluoroethylene. The reactors and contents were heated at 40–50° C. for about 12–15 hours at 900 atmospheres pressure. When the dichlorodifluoroethylene was 1,1-dichloro-2,2-difluoroethylene, there was obtained 43 parts of polymer which contained 11.2% fluorine. When the dichlorodifluoroethylene was 1,2-dichloro-1,2-difluoroethylene, there was obtained 40 parts of polymer which contained 14.3% fluorine.

EXAMPLE XII

*Polymerization of vinyl acetate*

A flask equipped with a stirrer was charged with 1100 parts of vinyl acetate, 275 parts of methanol and 4.5 parts of alpha,alpha′-azobis-(alpha,gamma - dimethyl - gamma-methoxy-valeronitrile). The charge was stirred under a nitrogen atmosphere at 30° C. for 4½ hours. There was obtained a 31% yield of polyvinyl acetate. Under the same conditions except that alpha,-alpha′ - azobis(alpha,gamma - dimethylvaleronitrile) was used as the catalyst, no polymer was obtained.

Addition polymerization (including copolymerization) of polymerizable compounds containing at least one ethylenic double bond including polymerizable vinyl and vinylidene compounds, polymerizable hydrocarbons containing a vinyl group, etc. is catalyzed at relatively low temperatures with unusual speed by the azo compounds of this invention. Thus the azo compounds of this invention are useful as initiators in the polymerization and copolymerization of ethylene, tetrafluoroethylene, styrene, vinyl and vinylidene halides, e. g., vinyl fluoride, vinylidene chloride, vinyl esters, e. g. vinyl acetate, acrylyl and methacrylyl compounds, e. g., acrylonitrile, methacrylonitrile, and methacrylamide, and compounds containing two or more isolated or conjugated ethylenic double bonds, e. g. the diacrylic acid esters of glycol and polyethylene glycols, tetraethylene glycol dimethylacrylate, diallyl diglycolate, diallyl carbonate, diallyl phthalate, ethylene bis(allyl maleate), butadiene, chloroprene, styrene/maleic anhydride mixture, etc. These polymerizable vinylidene compounds, including polymerizable vinyl compounds, mostly are polymerizable unsaturated compounds having a $CH_2{=}C{<}$ group, i. e. are monomeric unsaturated polymerizable compounds in which the unsaturation is due to one or a plurality of, i. e. more than one, terminal ethylenic group to which is attached a negative radical.

The new azo compounds of this invention may be prepared in the general manner described in Example I, i. e., reacting hydrazine with at least two moles of a ketone of the general formula

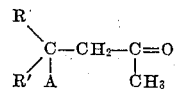

wherein R and R′ are lower aliphatic radicals, preferably alkyl radicals of one to four carbons, e. g. $CH_3$, $C_2H_5$, $C_3H_7$ and $C_4H_9$, and A is a radical which is attached to the carbon of the ketone by a non-metallic element of atomic number of at least 6 and preferably 6 to 8. The radical A may be COOH, CH, COO alkyl, aryl, alkyl, alkoxy, halogen, e. g., chlorine, hydroxyl, acetyl, amino substituted amines as diethylamino, sulfur as in a thiol.

The azine compound thus produced is reacted with excess hydrogen cyanide generally containing less than 50% water to give the hydrazonitrile. The hydrazo compound obtained by this reaction is oxidized to the azo compound by such oxidizing agents as chlorine or bromine. The azo compounds thus obtained are represented by the formula

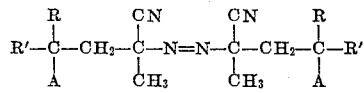

where R, R′, and A are as above. The preferred catalysts because of their great activity at relatively low temperature, e. g. 20–50° C., are those of the formula

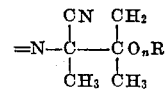

where $n$ is a cardinal number not more than 1, i. e., 0 or 1, and R is a monovalent hydrocarbon radical of one to six carbons. Of these the compounds where $-O_nR$ is an alkoxy radical of one to four carbons are particularly effective in polymerization.

In addition to the increased speed of polymerization obtained in the polymerization of compounds containing ethylenic unsaturation, these azo compounds are generally free from tendencies to discolor the polymer, to oxidize the polymer, to give cross-linking effects in the polymer, and to oxidize any added dyestuffs or pigments.

The azo compounds of this invention are useful as intermediates in the preparation of the corresponding dinitrile (i. e., by removal of the azo nitrogens) by decomposition by heat. Compounds of the general type represented by the general formula but which have the cyano group replaced by carbalkoxy, e. g., carbethoxy, or carbonamide can be prepared from the nitrile by treatment with alcoholic hydrogen chloride followed by hydrolysis with water to give the ester and treatment of the ester with ammonia or an appropriate hydrogen-bearing amine to give the amide. The carbalkoxy and carbonamide groups are negative groups neutral with respect to acidity and compounds having these groups are also useful for polymerization of ethylenically unsaturated polymerizable compounds.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An azonitrile of the formula

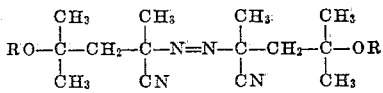

wherein R is an alkyl group of one to four carbons.

2. A polyfurcate azonitrile of the formula

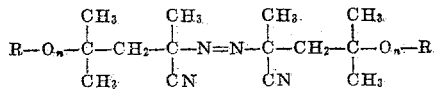

where $n$ is a cardinal number not greater than 1 and R is a monovalent hydrocarbon radical of one to six carbons.

3. Alpha,alpha'-azobis(alpha,gamma-dimethyl-gamma-methoxyvaleronitrile) of the formula

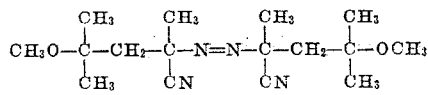

4. Alpha,alpha' - azobis(alpha,gamma,gamma-trimethylvaleronitrile) of the formula

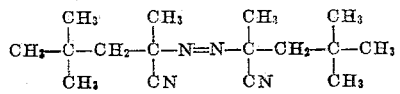

5. An azonitrile of the formula

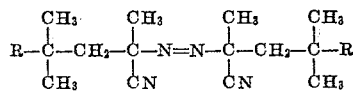

wherein R is a monovalent hydrocarbon radical of one to six carbons.

JAMES A. ROBERTSON.

REFERENCES CITED

The following references are of record in the file of this patent:

UNITED STATES PATENTS

| Number | Name | Date |
|---|---|---|
| 2,109,183 | Roos | Feb. 22, 1938 |
| 2,297,801 | Rossander et al. | Oct. 6, 1942 |
| 2,380,710 | Stewart | July 31, 1945 |
| 2,391,393 | Coffman et al. | Dec. 25, 1945 |
| 2,469,358 | Alderson et al. | May 10, 1949 |
| 2,471,959 | Hunt | May 31, 1949 |
| 2,492,763 | Pinkney | Dec. 27, 1949 |

FOREIGN PATENTS

| Number | Country | Date |
|---|---|---|
| 68,201 | Norway | Aug. 14, 1944 |

OTHER REFERENCES

Dox, JACS, v. 47 (1925), p. 1471–1477, 7 pages.
Hartman, Chem. Weekblad, v. 23 (1926), p. 77–78, 2 pages.